US009228729B2

(12) United States Patent
Polick et al.

(10) Patent No.: US 9,228,729 B2
(45) Date of Patent: Jan. 5, 2016

(54) LAMP WITH A SINGLE ARM

(71) Applicant: Contemporary Visions, L.L.C., Larchmont, NY (US)

(72) Inventors: Peter Polick, New York, NY (US); Robert A. Sonneman, Mamaroneck, NY (US)

(73) Assignee: CONTEMPORARY VISIONS, L.L.C., New York, NY (US)

( * ) Notice: Subject to any disclaimer, the term of this patent is extended or adjusted under 35 U.S.C. 154(b) by 16 days.

(21) Appl. No.: 14/140,851

(22) Filed: Dec. 26, 2013

(65) Prior Publication Data

US 2014/0169007 A1 Jun. 19, 2014

Related U.S. Application Data

(63) Continuation-in-part of application No. 13/927,252, filed on Jun. 26, 2013.

(60) Provisional application No. 61/666,283, filed on Jun. 29, 2012.

(51) Int. Cl.

*B60Q 1/00* (2006.01)
*F21V 21/26* (2006.01)
*F21S 6/00* (2006.01)
*F21S 8/00* (2006.01)
*F21V 21/30* (2006.01)
*F21Y 101/02* (2006.01)

(52) U.S. Cl.

CPC ................ *F21V 21/26* (2013.01); *F21S 6/003* (2013.01); *F21S 8/033* (2013.01); *F21V 21/30* (2013.01); *F21Y 2101/02* (2013.01)

(58) Field of Classification Search

CPC .......... F21V 21/26; F21V 21/30; F21S 6/003; F21S 8/033
USPC ................ 362/285, 287, 418, 413, 457, 407; 248/280.11, 282.1, 285.1
See application file for complete search history.

(56) References Cited

U.S. PATENT DOCUMENTS

| | | | | |
|---|---|---|---|---|
| 3,243,497 | A * | 3/1966 | Kendall et al. | 174/61 |
| 3,374,347 | A * | 3/1968 | Hirose | 403/111 |
| 4,080,530 | A * | 3/1978 | Krogsrud | 362/402 |
| 4,160,536 | A * | 7/1979 | Krogsrud | 248/280.11 |
| 4,166,602 | A * | 9/1979 | Nilsen et al. | 248/280.11 |
| 4,770,384 | A * | 9/1988 | Kuwazima et al. | 248/281.11 |
| 5,108,061 | A * | 4/1992 | Vlasak | 248/162.1 |

* cited by examiner

*Primary Examiner* — Ali Alavi
(74) *Attorney, Agent, or Firm* — Gottlieb, Rackman & Reisman, P.C.

(57) ABSTRACT

A lamp suitable for desk tops and the like includes a leg or upright resting on a base or other stationary element. An arm is secured to the leg and has a light source at its end. The arm and upright can be pivoted about various axes to allow the light source to be positioned arbitrarily to various positions. A support mechanism is provided inside the upright and the arm. The mechanism includes coil springs that are selectively compressed as the arm and upright are moved to generate supporting forces. The arm and upright does maintain their position and do not fall over after the light source has been positioned to the desired location. In another embodiment, the leg is omitted.

8 Claims, 13 Drawing Sheets

LAMP WITH A SINGLE ARM

RELATED APPLICATIONS

This application is a continuation in part to application Ser. No. 13/927,252 filed Jun. 26, 2013 which in turn claims priority to U.S. Patent Application Ser. No. 61/666,283 filed Jun. 29, 2012, all incorporated herein by reference in their entirety.

BACKGROUND OF THE INVENTION a. Field of Invention

This invention pertains to a lamp assembly formed of base an upright leg and cantilevered arm terminating at the free end with a light source. The leg and the arm include compression springs adapted to balance the arm and the light source so that the light source can be moved to any position and stay at the position when released without tipping in any direction. Alternatively, the leg is omitted and the arm mounted directly on a base.

b. Description of the Prior Art

Cantilevered lamp assemblies generally included an articulated arm with a light source at the free end and a mounting element used to mount the lamp to a desk, a wall or a stanchion extending to the floor or other flat service. These types of assemblies are used in residential, commercial or industrial settings, including, schools and universities, medical and dental offices, etc.

Typically, the articulated arm for these lamp assemblies consists of two or more sections joined by complex hinges and other similar interconnecting components. The lamp assemblies are arranged and constructed to allow a user to move the light source in three different directions to direct light from a light source at a particular zone of a surface or work area. The combined weight of the arm sections, the light source and other elements impose considerable forces and twisting torques on the various interconnecting components of the system. It is difficult to make a cantilevered lamp that can resist these forces so that the light source can be moved to virtually any arbitrary position and left there without the light source tipping in any direction.

In order to resolve this problem, lamps have been devices with various combinations of strain and force relieving means including various cables, strings, pulleys, springs, and arms arranged in a parallelogram etc. Of course, all these relieving means added more parts and complexity to the lamp resulting in increased costs and assembling difficulties. Moreover, external springs and other elements are undesirable since they are exposed to the elements, dust and corrosion and are esthetically unpleasing.

The present invention provides a lamp assembly in which the above described problems are eliminated, or at least substantially reduced.

SUMMARY OF THE INVENTION

A lamp constructed in accordance with this invention includes an upright member having a lower end and an upper end defining an upright member longitudinal axis; an arm having a first arm end and a second arm end; a light source attached to said second arm; a first pivot hingedly supporting said lower end; a second pivot hingedly supporting said first arm end at said upper end; said upright member including a support element preventing said arm and upright member from moving once said upright member and said arm have been pivoted to position said light source at a desired location, said support element including a rod having a first and a second rod end and being pivotably supported on a stationary member at said first end, and being pivotably connected to said upright member at said second end, a fixed block, and a first spring coupled between said second rod end and said block, said support element being configured to cause said first spring to compress against said block thereby generating a support force for said arm and said upright member.

In one embodiment, the upright member includes a sleeve extending between said upper and lower ends, said block being attached to said sleeve, and a first slider attached to said second rod end and reciprocated within said sleeve as said upright member is pivoted, said first spring being compressed between said slider and said block. Preferably, the upright member further includes a second slider slidably disposed in said sleeve near said upper end and connected to said first slider, said first and second slider being moved simultaneously. A second spring is disposed between said second slider and said block, said second spring providing supporting force, In one embodiment, the lamp also includes a base, said first pivot being attached to said base. Preferably, the first pivot is adapted to pivot said upright member about a vertical axis and a horizontal axis.

In one embodiment, the arm includes an arm block and an arm spring, said spring being configured to provide further support forces depending on the position of said upright member.

In one embodiment, the lamp also includes an arm slider, said arm spring being selectively compressed between said arm slider and arm block an interconnecting member transmitting the movement of said first slider to said arm slider. The second pivot includes a hinge interconnecting said upper and said first arm ends and a cam linkage coupled to said first slider and said arm slider.

In one embodiment, the upright member includes a second slider slidably disposed in said sleeve near said upper end, said second slider being connected to said first slider and said arm slider, said first slider, second slider and said arm slider being moved simultaneously, and a second spring disposed between said second slider and said block.

In one embodiment, the leg is mounted in a socket incorporated into a horizontal surface. In another embodiment, a wall mount is provided with its own socket receiving the leg.

DETAILED DESCRIPTION OF THE PREFERRED EMBODIMENT

Figure 1:
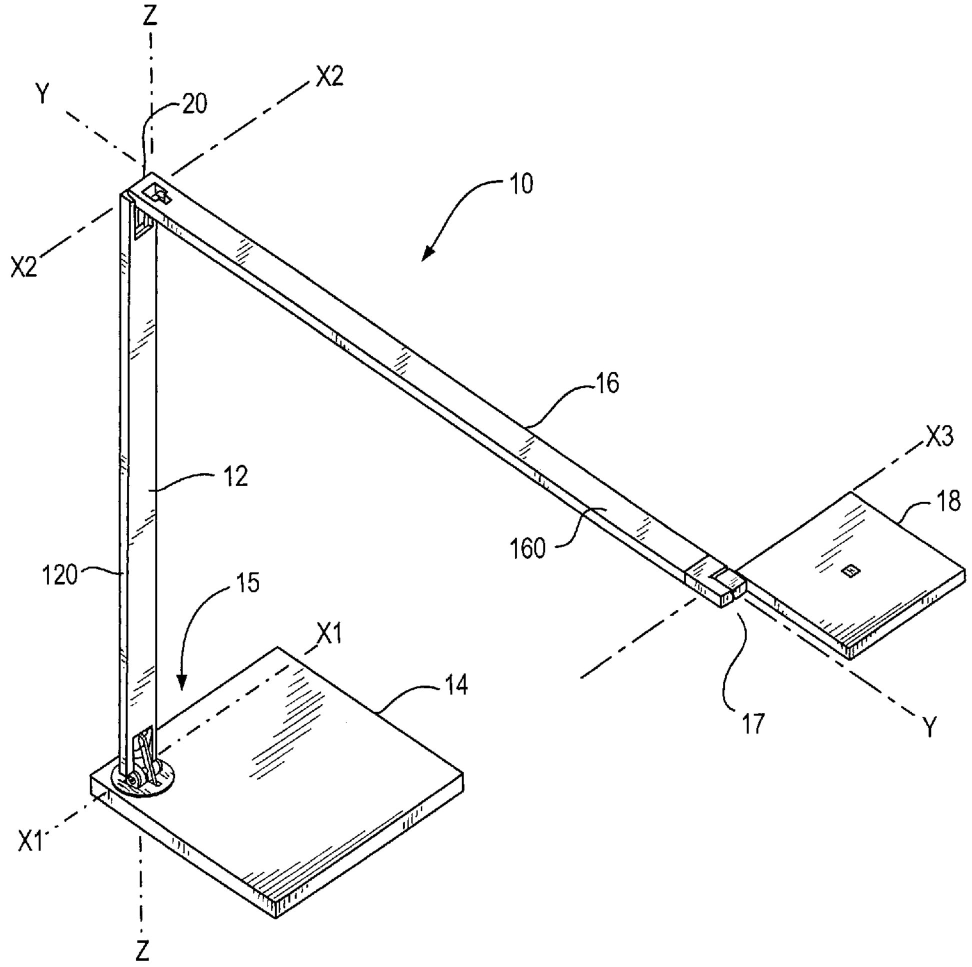
FIG. 1 shows an orthogonal view of the lamp constructed in accordance with this invention.

Lamp 10 constructed in accordance with this invention includes a leg 12 attached to a base 14 by a hinge or pivot 15 and an arm 16 having a lamp head 18 at one end and attached to the leg 12 by a hinge or pivot 20.

The leg 12 includes a sleeve 120 preferably having a rectangular cross section with various internal elements of the lamp (described in detail below and in FIG. 2) being disposed in this sleeve. Similarly arm 16 includes a sleeve 160. A multiconductor wire (not shown) is threaded through the sleeves and extends from the base to the lamp head 18 to provide electricity.

Figure 2:
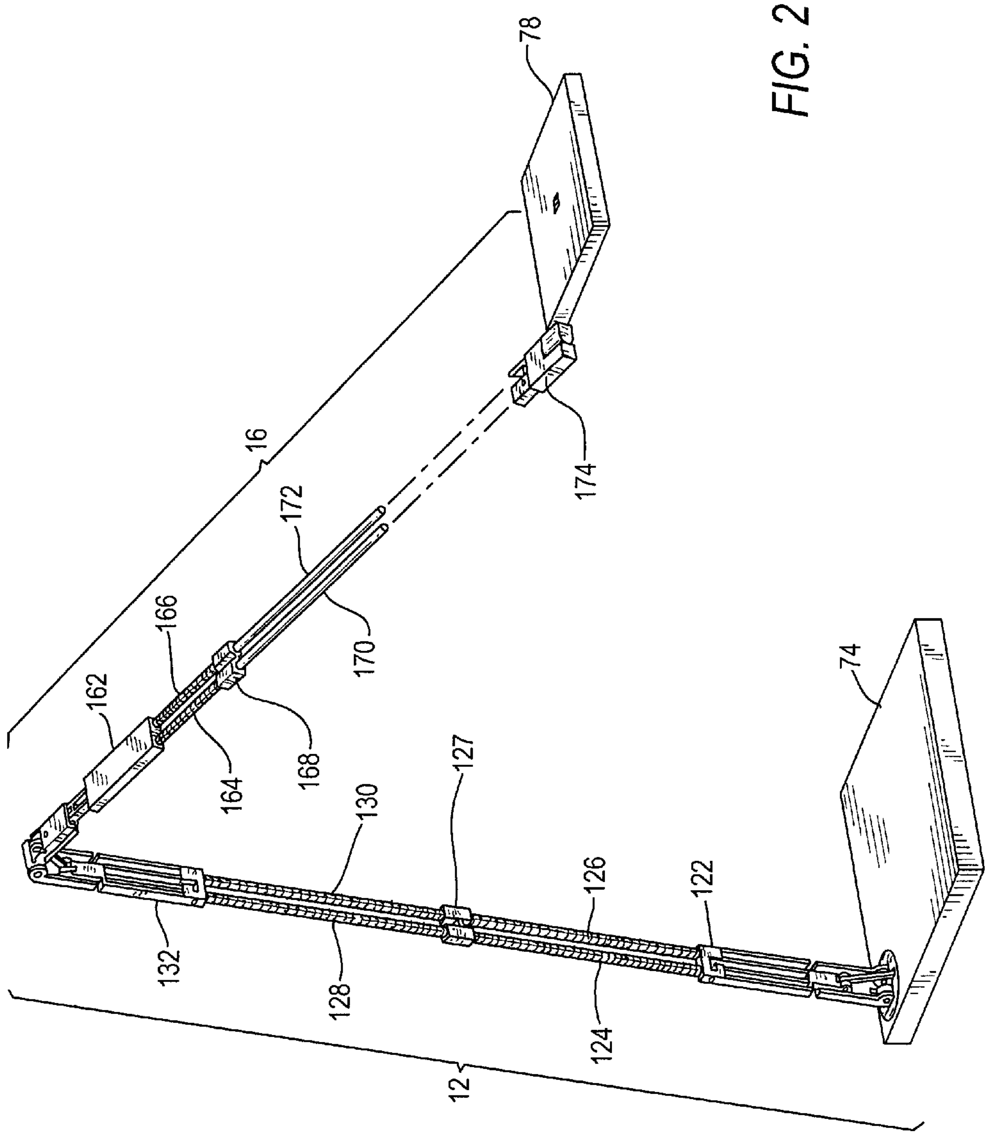
FIG. 2 shows an orthogonal view of the lamp without sleeves.
Figure 3:
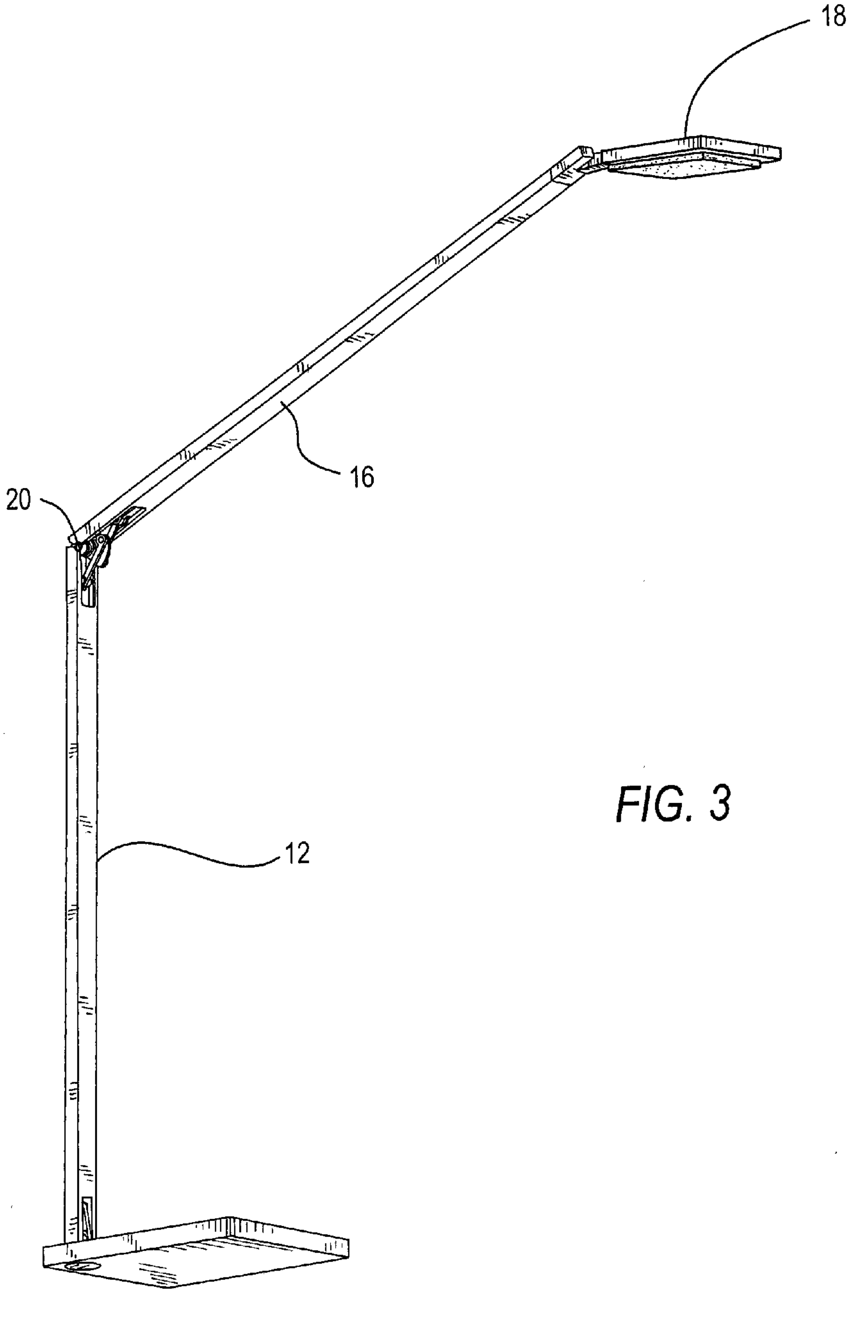
FIG. 3 shows left view of the lamp of FIG. 1.
Figure 3A:
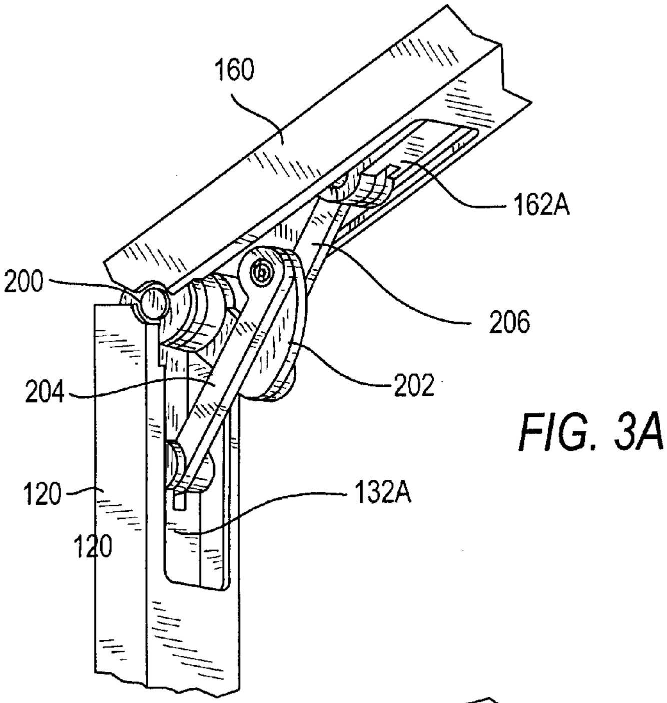
FIG. 3A shows an enlarged view of the elbow as seen from the left.
Figure 4A:
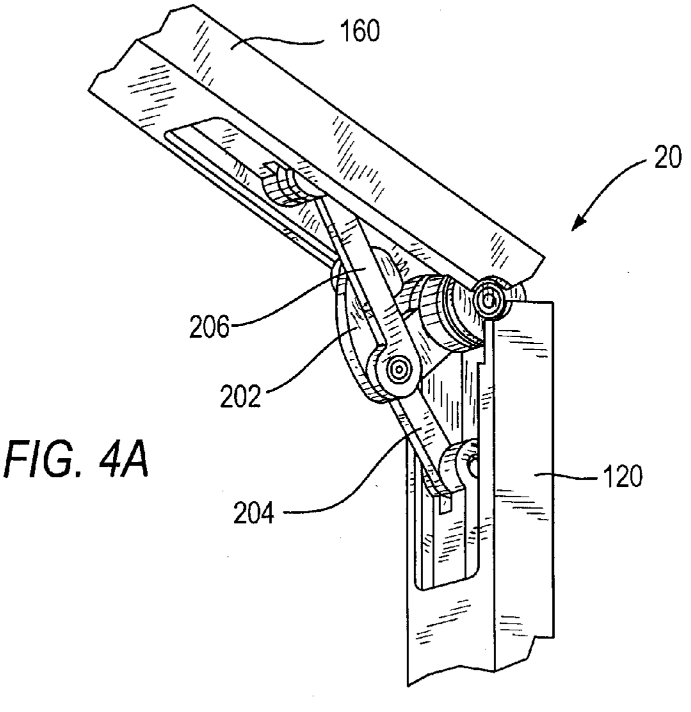
FIG. 4A shows an enlarged view of the elbow as seen from the right.
Figure 4:
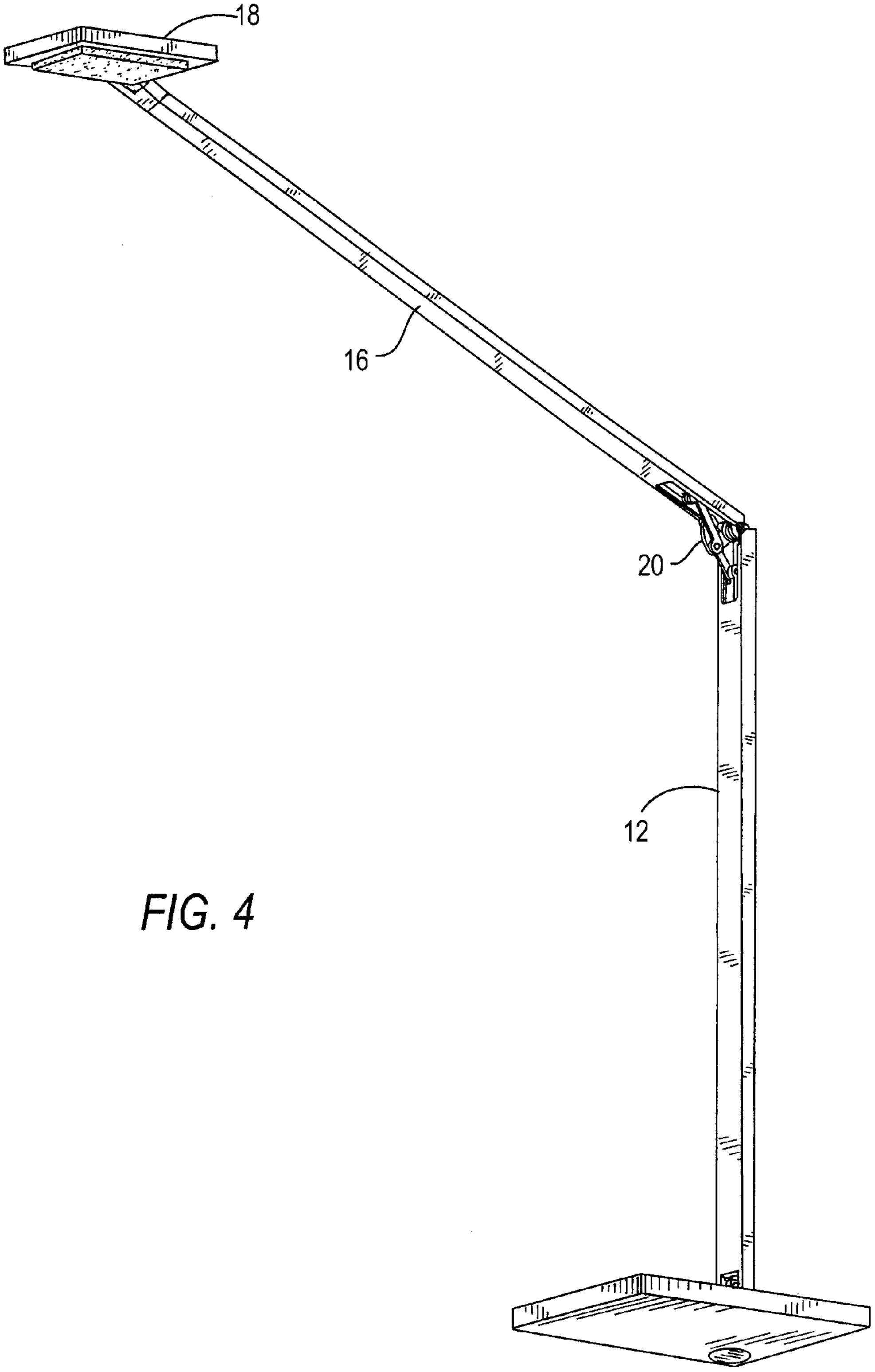
FIG. 4 shows a right view of the lamp of FIG. 1.

As shown in FIG. 2, leg 12 further includes, starting from the bottom, a first slider 122, two compression springs 124, a bearing block 126, two more compression springs 128, 130 and a second slider 132. The two sliders 122, 132 are connected by a pair of parallel rods extending through the bearing block 127 so that the two sliders 122, 132 always move together longitudinally within sleeve 120 (The springs 124, 126, 128, 130 are wrapped around these rods so that they are not visible in FIG. 2). The block 126 is fixed in the sleeve and has holes for the rods interconnecting sliders 122, 132.

Arm 16 has a somewhat similar structure to leg 12 and it includes a slider 162, two parallel compression springs 164, 166, a fixed bearing block 168 and two rods 170 172 slidably passing through block 168. In this case, one end of the rods 170, 172 is secured to the slider 162 and the other end to the end block 174.

Wherever two parallel compression springs are shown, it is possible to use a single spring, however two parallel springs provide a smoother motion and insure that sliders attached thereto do not jam.

Referring now to FIGS. 3, 3A, 4, 4A, the hinge 20 is provided between the leg 12 and arm 16 to allow the arm 16 to be rotated with respect to the leg 12 as desired. The hinge includes a pin 200 with a cam linkage 202 and a first rod 204 connected between the top end 132A of slider 130 and the cam linkage 202. Another rod 206 extends between the cam linkage 202 and an end 162A of slider 162. The cam linkage 202 is generally triangular and is pivotably mounted on pin 200. The rods 204 and 206 are also pivotably connected to the cam linkage 202 and the respective sliders 132, 162. As mentioned above, the arm 16 and leg 12 can be pivoted with respect to each other through hinge 20.

Figure 5:
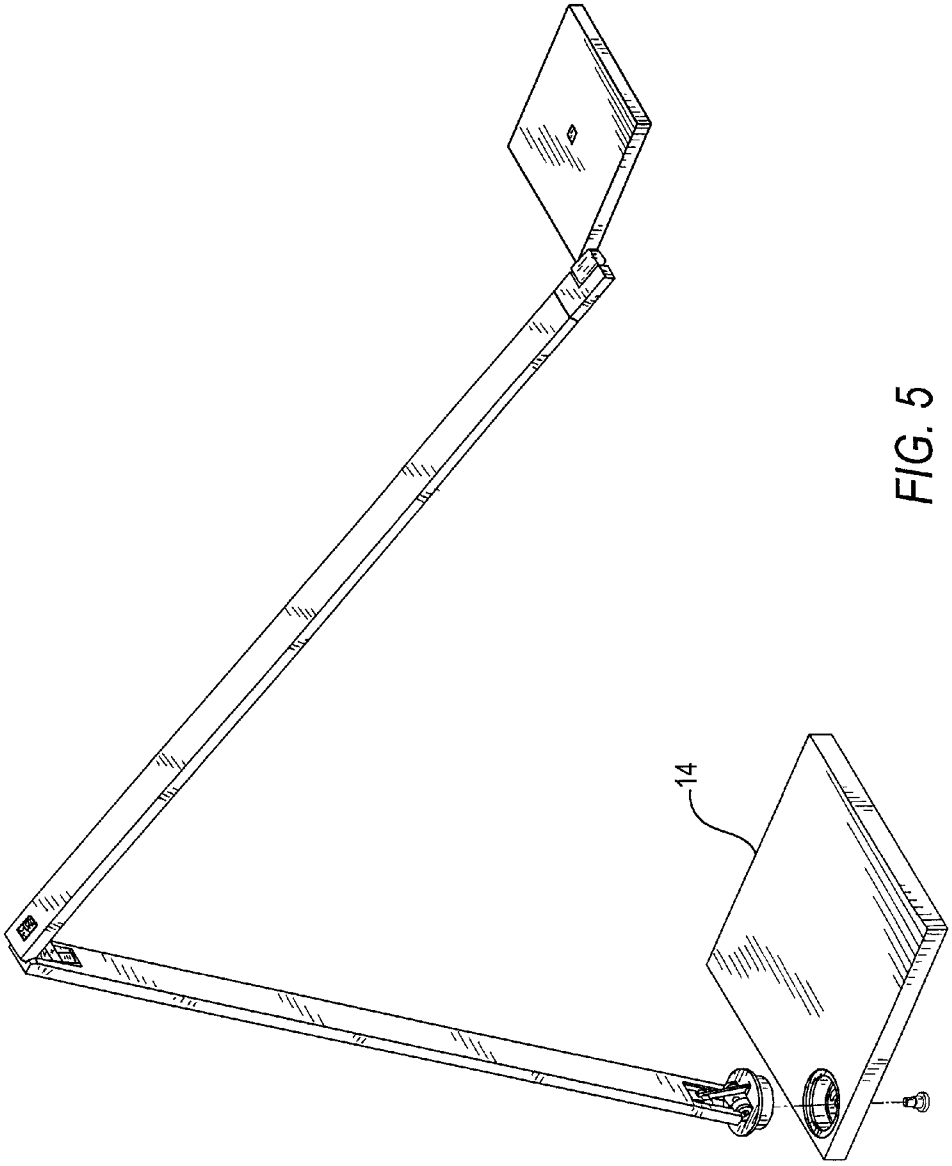
FIG. 5 shows an orthogonal view of the lamp being removed from its base.
Figure 5A:
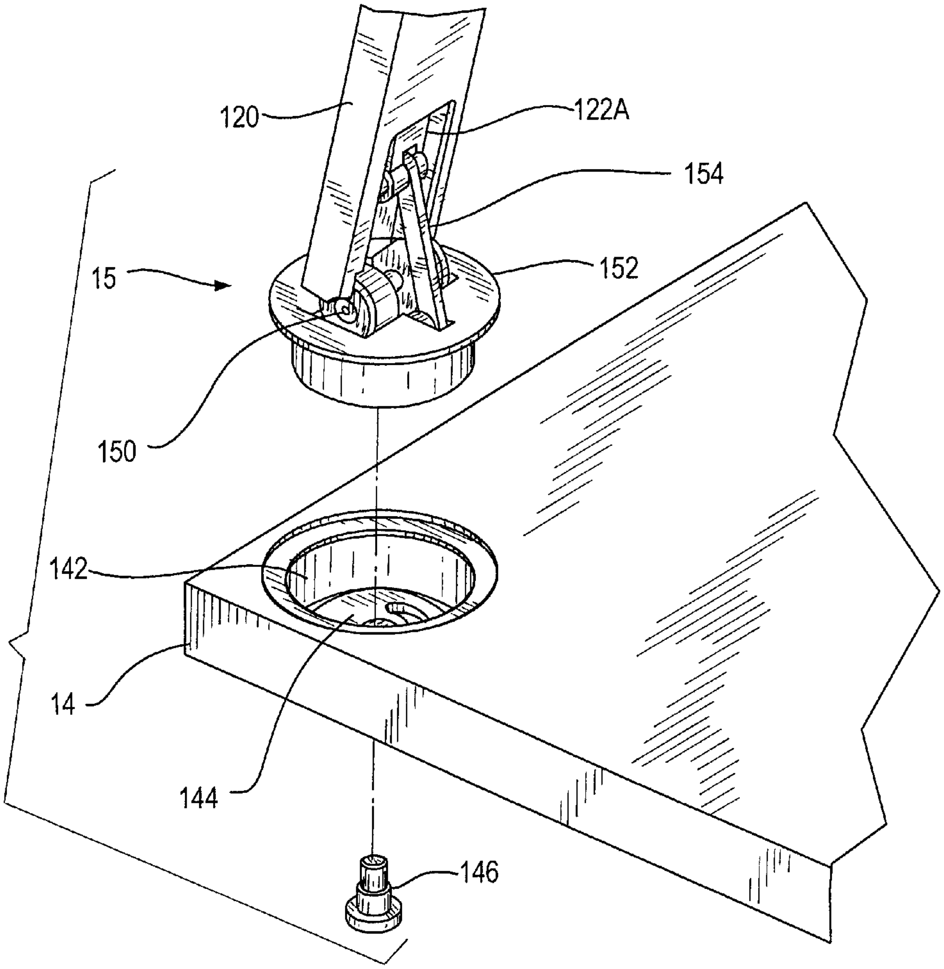
FIG. 5A shows an enlarged view of the lamp and its base.

Referring to FIGS. 5 and 5A, hinge 15 includes a hinging mechanism 150 arranged to hingedly a couple disc-shaped element 152 with leg 12. In addition, a rod 154 is hingedly connected at one end with base 152 and at the other end with the lower end 122A of slider 122.

Base 14 is provided with a round hole 142 having a bottom plate 144. The round hole 142 is sized and shaped to element 152. The element 152 (and therefore the rest of the lamp) is rotatably attached to the base 14 by screw 146. The element 152 has an extension (not shown) that engages the plate 144 such that the rotational movement of the element 152 is limited to a predetermined angle, about a vertical axis (not shown) passing through hole 142 such as 90 degrees.

Figure 1A:
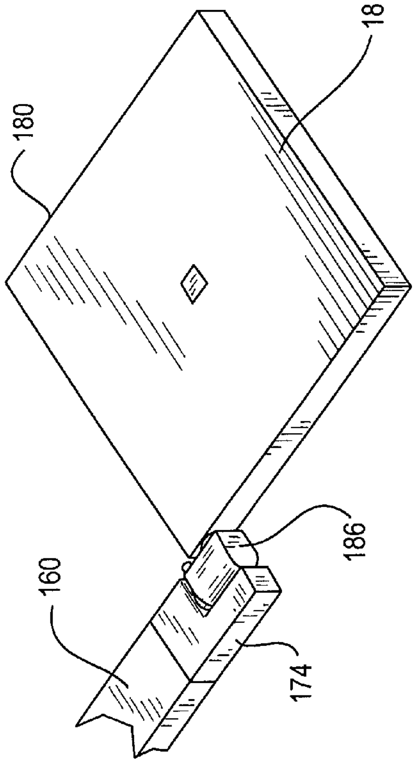
FIG. 1A shows an orthogonal enlarged view of the lamp head.
Figure 1B:
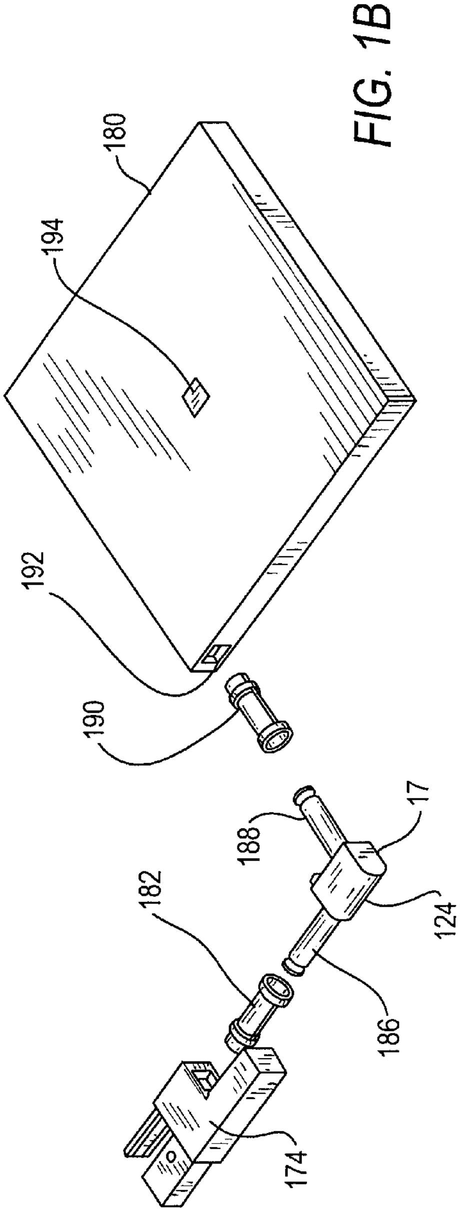
FIG. 1B shows an orthogonal enlarged exploded view of the lamp head.

Referring to FIGS. 1, 1A and 1B, head 18 includes a generally square housing 180 holding a light source, such as an LED panel (not shown). The lighting panel is powered from a wire snaking through from the base 14, through leg 12 and arm 16 and controlled by a switch 194. In one embodiment, switch 194 is a multi-position proximity switch that senses when a person's hand is hovers over the switch 194 and operates the LED panel by setting off or turning on at one or more intensities.

The head 18 is attached to arm 16 by a hinge 17 including a sleeve 182 extending into the end 174 of arm 16. A corner piece 184 is formed with two pins 186, 188. A second sleeve 190 is captured within a hole 190 in housing 180 as shown. The pins 186, 188 are inserted into, and are captured by sleeves 182, 190 respectively.

As discussed above, the hinges 15, 17, 20 provide several degrees of freedom of rotation for head 18. More particularly, leg 12 can be rotated with respect to base 14 about a horizontal axis X1-X1 and a vertical axis Z-Z. Arm 16 can rotate about a horizontal axis X2-X2 with respect to leg 12. Head 18 can rotate about a horizontal axis X-3, X-3 and another axis Y-Y with respect to arm 16.

Of course without any further restraints, once the head 18 is positioned to any arbitrary location with respect to the base 14 and is then released, the head 18 would either flop down or the hinges 15, 20, 17 would have to be so tight as to render essentially unusable. Thus the head 18, as well as the arm 16 and leg 12 are provided support by the members within the sleeves 120, 160 as follows. Pivoting the leg 12 backward, away from the base 14, causes the sliders 122, 132 to slide up. Since block 127 is fixed in position, this motion of the sliders 122, 132 causes springs 124, 126 to compress. In addition, when slider 132 moves upward, the rod 204 causes the cam linkage 202 to rotate counterclockwise (as viewed in FIG. 2 or 3A) thereby pushing the slider 162 to the right via rod 206, and thereby compressing springs 164, 166 against block 168 and causing the arm 14 to rotate counterclockwise.

Moving the leg 12 for causes reverses the action just described. When the leg 12 is pivoted beyond 90 degrees with respect to the base, springs 128, 130 are compressed against block 127.

When the leg 12, arm 16 or lamp 18 are released, the force of the springs that are compressed retains the leg 12 and arm 16 in their last respective positions. In this manner, the need for cumbersome and expensive arrangements with parallelograms, or other external means such as springs, cables, pulleys, etc., as used in previous mechanisms is eliminated.

The arrangement of springs blocks and sliders disclosed herein may be used in other types of devices as well, not just lamps.

Figure 6:
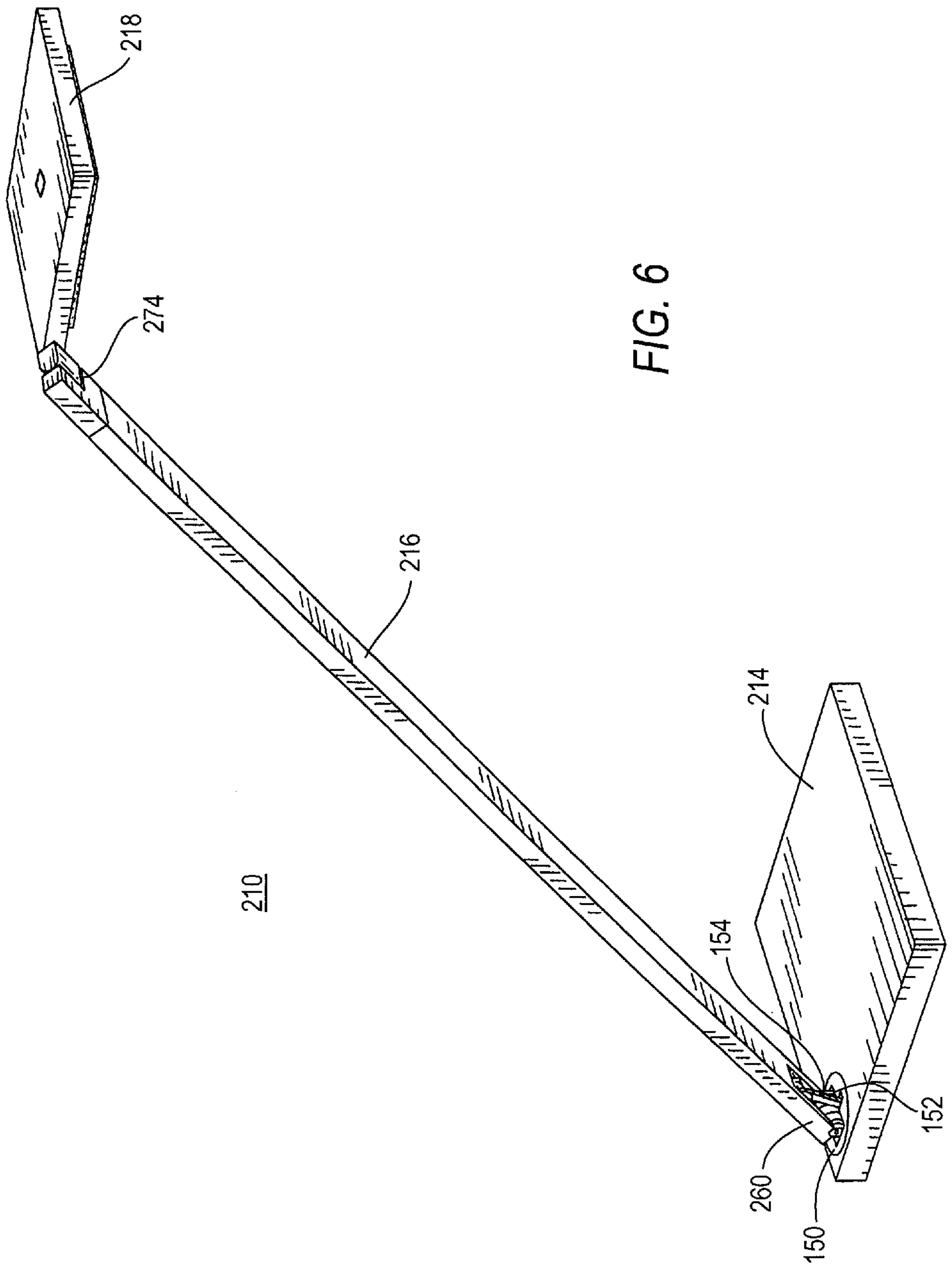
FIG. 6 shows an orthogonal view of another embodiment of the lamp with an arm.

FIG. 6 shows another embodiment of the invention. In this embodiment, a lamp 210 includes a base 214, an arm 216 and a light source 218. The base 214 is identical to the base 14 in FIG. 1, the light source 218 is identical to light source 18 and is mounted to arm 216 by a hinge 217 that is identical to hinge 17. The arm 216 is connected to the base 214 by a hinge 215 that is identical to hinge 215. Arm 216 is formed of a hollow sleeve 260 which houses includes slider 162, the two parallel compression springs 164, 166, fixed bearing block 168 and the two rods 170 172 slidably passing through block 168. One end of each of the rods 170, 172 is secured to the slider 162 and the other end to the end block 174 forming hinge 217.

However end 162A of slider 162 is now connected one end of rod 154 (see (FIG. 6). The sleeve 260 is connected to hinge 150. The hinge 150 and the rod 154 are connected to cylindrical element 152 which fits in a matching hole in base 214. The element 152 can rotate about a vertical axis with respect to the base 214 thereby rotating light source 218. The arm 216 can pivot by about 85-110 degrees with respect to a horizontal axis defined by hinge 150.

Figure 7A:
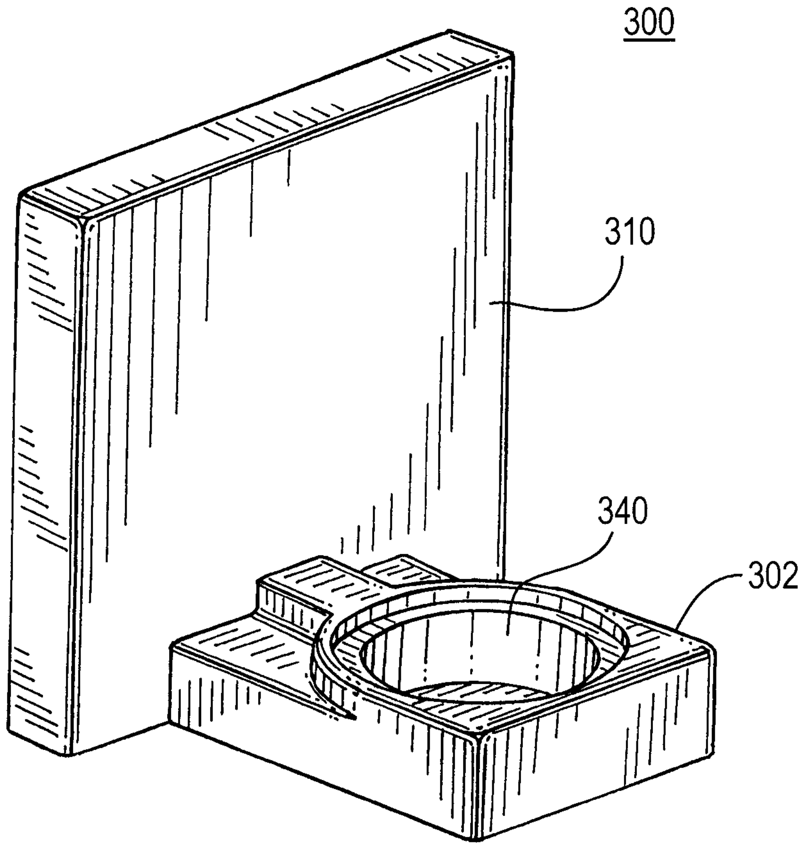
FIG. 7A shows an orthogonal view of the lamp support for wall mounting.
Figure 7B:
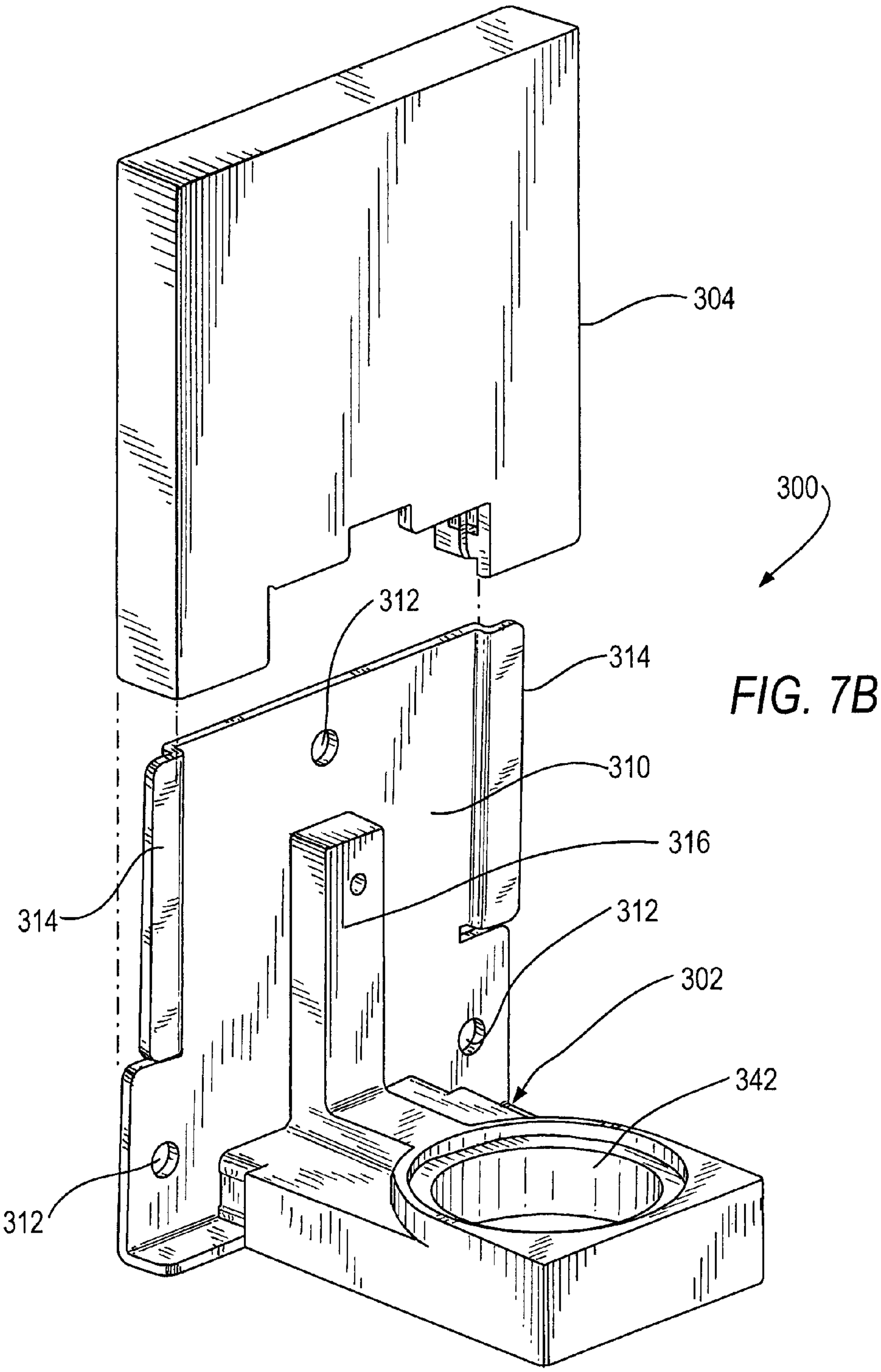
FIG. 7B shows two parts of the lamp support separated.

In another embodiment of the invention, the lamps described above can be provided in a wall-mounted version. For this embodiment, a wall mount 300 is provided instead of base 14 or 214. As shown in FIGS. 7A and 7B wall mount 300 includes an L-shaped support 302 and a sleeve 304. The support 302 includes a horizontal portion 310 formed with a hole 342 similar to hole 142 in FIG. 5A. Hole 342 is sized and shaped to receive cylindrical element 152. The support 302 further includes a vertical wall 310 that is generally flat and is made with several mounting holes 312 for securing the wall support to a vertical surface. The wall 310 is formed with two side wings 314 that are offset from the rest of the wall 310. An L-shaped bar 316 reinforces the support 302 and may be hollow to accommodate electrical wiring for the lamp.

Sleeve 304 is sized and shaped to fit over the wall 310 and cover it, as shown in FIG. 7B.

Figure 8:
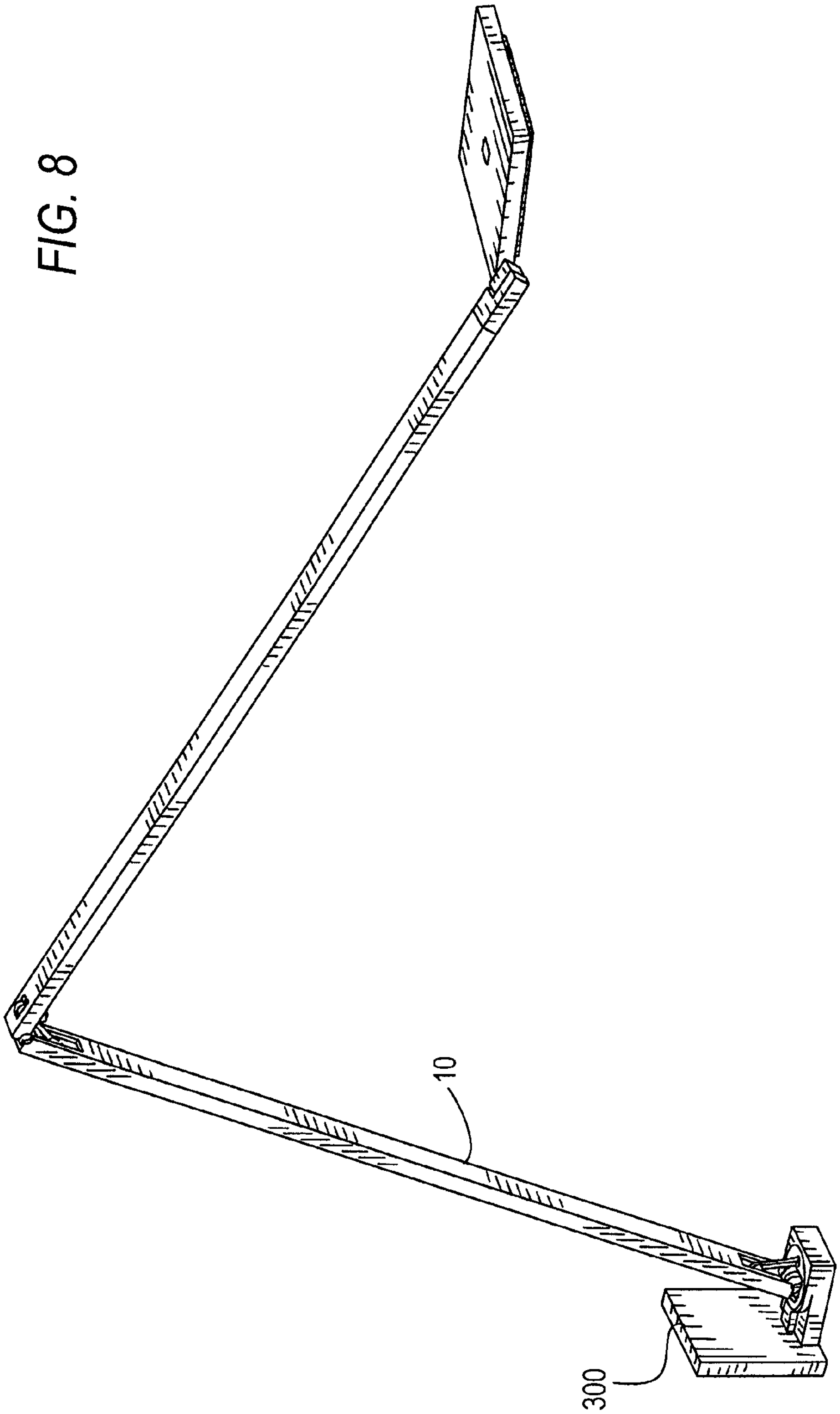
FIG. 8 shows an orthogonal view of the lamp of FIG. 1 on the lamp support of FIGS. 7A, 7B.

FIG. 8 shows a wall mounted lamp similar to the one shown in FIGS. 1-5 but being mounted on support 300.

Figure 9:
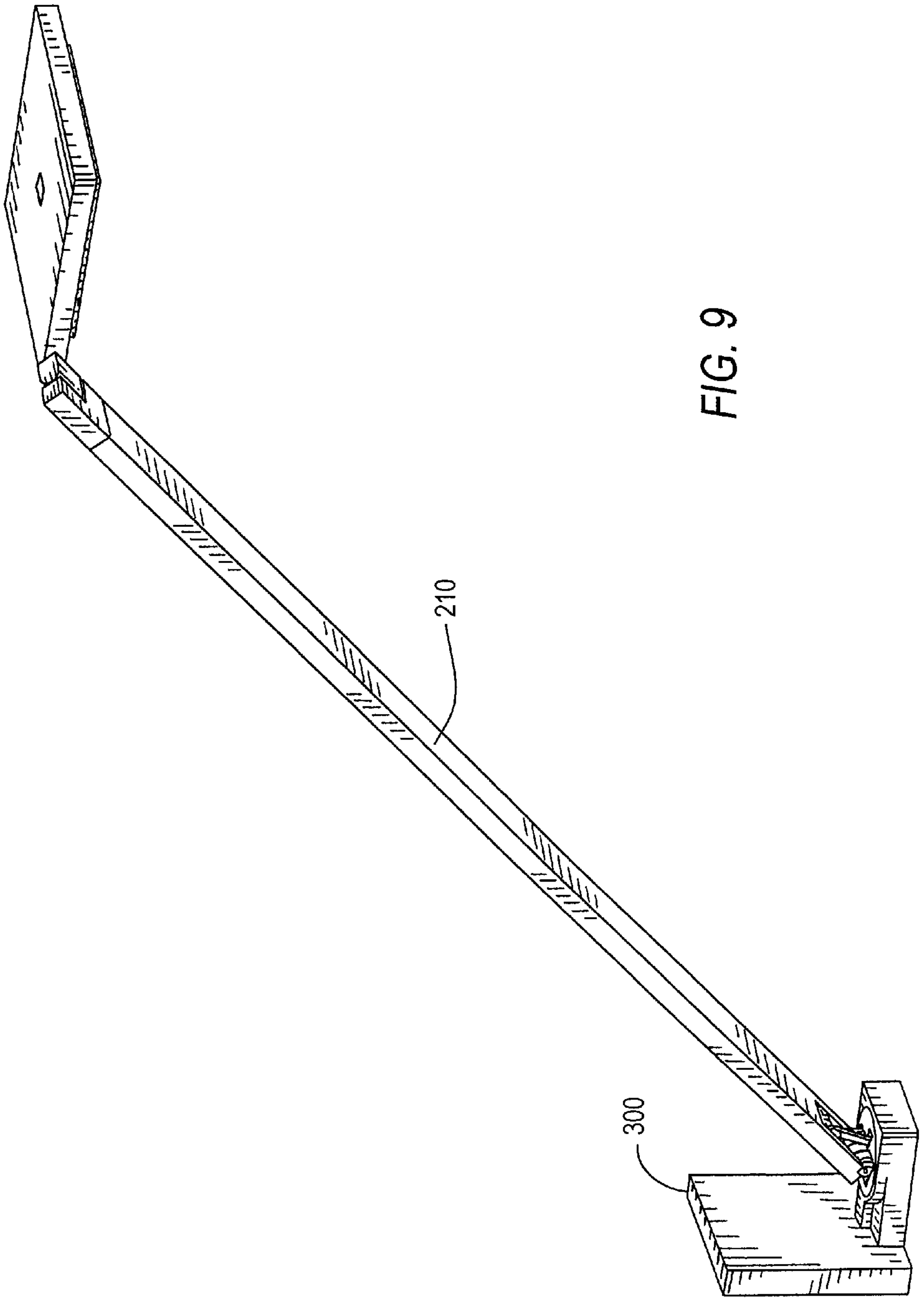
FIG. 9 shows an orthogonal view of the embodiment of FIG. 6 mounted on the lamp support of FIGS. 7A, 7B.

FIG. 9 shows a wall mounted lamp similar to the one shown in FIG. 6 but being mounted on support 300.

Numerous modifications may be made to this invention without departing from its scope as defined in the appended claims.

We claim:

1. A lamp comprising:

a stationary member;

an arm having a first arm end and a second arm end;

a light source attached to said second arm end; and a pivot hingedly supporting said first arm on said stationary member;

said arm including a sleeve, a fixed block disposed in said sleeve, a support element disposed in said sleeve and preventing said arm from moving once said arm has been pivoted to position said light source at a desired location, said support element including a rod having a first and a second rod end, a spring, and an arm slider slidably disposed within said sleeve and connected to said pivot, said spring being disposed between said slider and said block, and said rod having said first rod end connected to said second arm end and said second rod arm connected to said slider, said support element being configured to cause said spring to compress against said block when pushed by said slider as said arm is rotated about said hinge thereby generating a support force for said arm.

2. The lamp of claim 1 further comprising a base, said first pivot being attached to said base.

3. The lamp of claim 2 wherein said first pivot is adapted to pivot said arm about a vertical axis and a horizontal axis.

4. The lamp of claim 1 wherein said stationary member is configured to support said arm on a vertical surface.

5. The lamp of claim 1 wherein said stationary member is configured to support said arm on a horizontal surface.

6. A lamp assembly comprising:

a light head configured to generate light when activated;

a support;

an arm having a first and a second arm end supporting said light head, said arm including a sleeve extending between said ends, a slider having a first slider end and a second slider end, a support block affixed to said sleeve, a rod extending from said second slider end to said second arm end through said support block, coil spring extending between said block and said second slider end; and a pivot coupling said first arm end to said support with said arm being rotatable with respect to said support, with said first slider end being coupled to said pivot to cause said slider to slide longitudinally through said sleeve and push said rod and to selective compress said spring between said support block and said second slider end.

7. The lamp assembly of claim 6 wherein said support includes a socket with said arm being rotatably supported within said socket along a vertical axis and a horizontal axis.

8. The lamp assembly of claim 6 wherein said support is arranged and constructed to support said arm and said lamp head on a vertical wall.

* * * * *